C. H. FOX.
PUMP.
APPLICATION FILED JUNE 30, 1910.
1,091,496.
Patented Mar. 31, 1914.
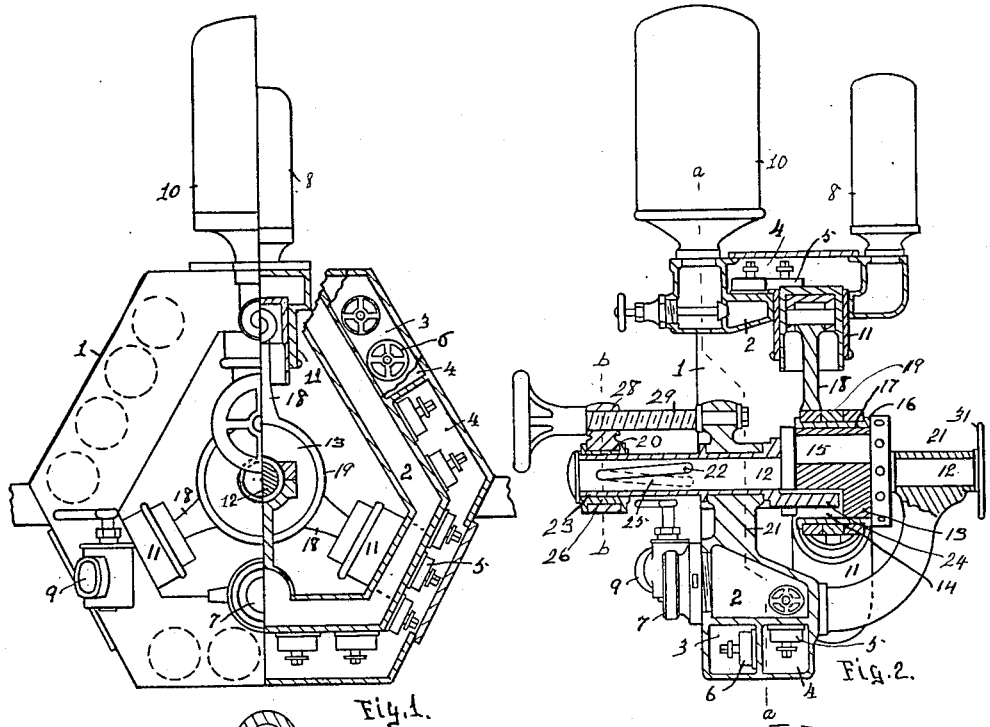
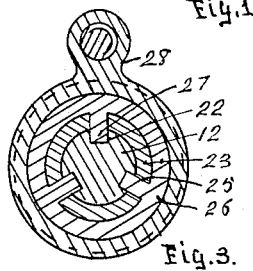
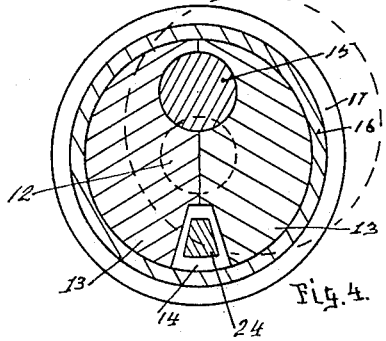
Witnesses.
M. E. Allendorf.
Samuel S. Carr.
Charles H. Fox. Inventor.
By Robert S. Carr. Atty.

UNITED STATES PATENT OFFICE.

CHARLES H. FOX, OF CINCINNATI, OHIO.

PUMP.

1,091,496.  Specification of Letters Patent.  Patented Mar. 31, 1914.

Application filed June 30, 1910. Serial No. 569,671.

*To all whom it may concern:*

Be it known that I, CHARLES H. FOX, a citizen of the United States, residing at Cincinnati, Ohio, have invented a new and useful Improvement in Pumps, of which the following is a specification.

My invention relates to pumps of the class adapted to the use of fire engines or other suitable places, and the objects of my improvements are to provide means for changing the length of the stroke of the plunger during the action of the pump under variable power conditions for maintaining a predetermined speed of the shaft; to position a series of pumps at intervals around the driving shaft for more evenly distributing the torque on said shaft and also for securing a more constant discharge of the water; to position the suction and pressure chambers around the driving shaft and in common communication with all the pumps for economizing space and obtaining a more compact structure, and to provide simple and durable construction and assemblage of the various parts for securing facility of operation and efficiency of action. These objects are attained in the following described manner as illustrated in the accompanying drawings, in which:—

Figure 1 is an end elevation with parts in section on the line *a—a* of Fig. 2 of a pump embodying my improvements; Fig. 2 a longitudinal vertical section; Fig. 3 a transverse section on the line *b—b* of Fig. 2, and Fig. 4 a transverse section of the eccentric adjustably mounted on the crank shaft.

In the drawings, 1 represents the casing inclosing the suction chamber 2, the pressure chamber 3 and a series of intervening pulsation chambers 4 having the usual valve connections 5 and 6 with the respective said suction and pressure chambers. The inlet opening 7 and the vacuum chamber 8 communicates with the said suction chamber 2 and the valve controlled discharge opening 9 and the air pressure chamber 10 communicates with the pressure chamber 3 in the usual manner.

A series of pump cylinders 11 distributed at equal intervals around the driven crank shaft 12 communicates with the respective pulsation chambers. A split eccentric 13 formed with a recess 14 may be movably secured on the crank pin 15 by means of a collar or ring 16 formed with an annular groove 17 in its face. The pump plungers 18 may be movably connected with the annular groove 17 by means of eccentric rings 19. The crank shaft 12 journaled in bearings 21 is formed with a series of parallel grooves 22 at an angle to its length like helices of high pitch. A sleeve 23 rotatively adjustable on shaft 12 is formed with a projecting dog 24 adapted to movably engage with the recess 14 in the eccentric and also with a series of parallel slots 25 oppositely inclined to and corresponding with the grooves 22 in said shaft.

A collar 26 slidably mounted on sleeve 23 is formed with an annular groove 20 in its face and with a series of inwardly projecting lugs 27 adapted to slidably engage with the corresponding slots and grooves in the sleeve and shaft. A bracket 28 movably seated in the annular groove 20 serves to move the collar longitudinally by means of the hand screw 29 being adjustably threaded therein. By means of the flange 31 the crank shaft may be coupled to a driven shaft (not shown) in the usual manner.

In operation, with the collar 26 in the extreme outward position as shown in Fig. 2, the eccentric is maintained by the dog on the slotted sleeve in a position concentric with the crank shaft and compensates for the eccentricity of the crank pin. In this position the pump plungers remain immovable during the rotation of the crank shaft with the slotted sleeve thereon. By means of the hand screw the collar 26 may be adjusted longitudinally in an inward direction on the sleeve 23 whereby the lugs thereon by sliding along the angular slots and grooves will cause the sleeve with the dog 24 to turn the eccentric out of its concentricity with the crank shaft as shown by dotted lines in Fig. 4 for imparting to and gradually increasing the stroke of the plungers as desired. The stroke of the plungers may be thus controlled to prevent excessive duty which would cause a decrease in the predetermined speed and consequent power of the crank shaft, that water may be thrown with the full speed of an engine under low pressure and in increasing volume proportioned to the increase of the pressure for maintaining the speed.

Having fully described my improvements, what I claim as my invention and desire to secure by Letters Patent of the United States is:—

1. The combination of a shaft formed with an eccentric intermediate portion, a sleeve, a compensating eccentric consisting of separable members assembled within the sleeve and mounted on said eccentric portion of the shaft, a dog mounted to turn with the shaft and movably engaging with the compensating eccentric, and means for rotatively adjusting the dog on the shaft together with said eccentric during the rotation of the shaft.

2. The combination of a crank shaft, a sleeve thereon provided with a dog, an eccentric mounted on the crank pin and engaging with the dog, said shaft and sleeve being formed with oblique grooves at an angle to each other, a pin slidably engaging with said grooves, and means for moving the pin along the grooves for rotatively adjusting the sleeve with the eccentric in relation to the shaft.

CHAS. H. FOX.

Witnesses:
R. S. CARR,
ROBERT W. THOMPSON.

---

Copies of this patent may be obtained for five cents each, by addressing the "Commissioner of Patents, Washington, D. C."